United States Patent

Pinsolle et al.

[11] Patent Number: 5,175,035
[45] Date of Patent: Dec. 29, 1992

[54] MULTILAYER SHEET WITH ONE LAYER EASILY PEELABLE FROM ANOTHER

[75] Inventors: Francis Pinsolle, Villefranche-sur-Mer; Vincent Chaupin, Cagnes-sur-Mer, both of France

[73] Assignee: Siamp-Cedap, Monaco, France

[21] Appl. No.: 690,987

[22] PCT Filed: Oct. 10, 1990

[86] PCT No.: PCT/FR90/00744
§ 371 Date: Jun. 18, 1991
§ 102(e) Date: Jun. 18, 1991

[87] PCT Pub. No.: WO91/05656
PCT Pub. Date: May 2, 1991

[30] Foreign Application Priority Data

Oct. 18, 1989 [FR] France .................. 89 13593

[51] Int. Cl.⁵ .............................. B29D 22/00
[52] U.S. Cl. .................. 428/35.7; 428/349; 428/523; 428/516
[58] Field of Search ........... 428/349, 35.3, 35.4, 428/35.8, 521, 517, 35.7, 523, 516

[56] References Cited

U.S. PATENT DOCUMENTS 4,803,102 2/1989 Rainere et al. .................. 428/349
4,842,187 6/1989 Janocha et al. .................. 428/349

OTHER PUBLICATIONS

European Space Agency File: Chemical Abstracts: Z. Funke et al.: Structure of heterogeneous blends of thermoplastics.
Notice of Rejection dated May 16, 1991 from Taiwan Patent Office No. 79109650.

Primary Examiner—Edith Buffalow
Attorney, Agent, or Firm—Darby & Darby

[57] ABSTRACT

Multilayer sheet for making containers with lid closed by sealing.

The upper layer 7 is comprised of an heterogeneous mixture of two products having different coefficients of viscosity, the most fluid product being compatible with the lower layer 8 of the lid.

Removal of the lid leads to tearing of the upper layer 7 by decohesion.

6 Claims, 1 Drawing Sheet

MULTILAYER SHEET WITH ONE LAYER EASILY PEELABLE FROM ANOTHER

BACKGROUND OF THE INVENTION

The invention pertains to a plastic multilayer sheet for making containers meant to be closed by means of a sealed lid.

The present invention also pertains to the production of containers made from this sheet, to be used for foodstuff for instance, and meant to be closed by a lid sealed to their open upper side. These containers are, for example, the boats or pots into which are sold foodstuff such as deserts.

These containers are usually thermoformed from a plastic in sheet form often presenting several layers of different materials such as polystyrene, ethylvinyl alcohol (EVOH) and polyethylene, bound by adhesives.

At present, the lids come in the form of a thin multilayer sheet comprised, for instance, of a sheet of aluminium or of polyester onto which the information meant for the customers is printed, and which is coated, on its side in contact with the container, with a thin layer of polyethylene.

It is by means of this thin layer of polyethylene that sealing of the lid to the lip presented by the container around its open side, is ensured.

When analysing the opening of a container so sealed, it is found that in many cases, this opening is difficult to perform.

Indeed, the lower layer of the lid and the upper layer of the container are both made of polyethylene and are sealed together. For the container to open, it must be possible to break the bond between the two sealed layers.

In some cases, the seal is very difficult to break, and the force that one is brought to excert on the lid often results in the tearing of the lid, hence making it necessary to take hold of the latter by small fragments.

In other cases, the thin polyethylene layer remains sealed to the container while having removed the upper layer(s) of the lid.

This problem of sealed containers has not yet been suitably and definitely resolved. For this reason, the objective of the present invention is to propose a novel solution permitting the production of a seal of the lid that is impervious and sufficiently resistant to the various demands to which it may be subjected during the commercialization of the containers, while permitting the easy removal of the lid without tearing it.

BRIEF DESCRIPTION OF THE INVENTION

The object of the invention is a plastic multilayer sheet for making containers, meant to be closed by a sealed lid, itself comprised of a multilayer sheet presenting a lower layer meant to be sealed to the upper layer of the said sheet, characterised in that the said upper layer is a composite layer, comprised of an heterogeneous mixture of two products of perceptibly different viscosities, the most viscous one of which is distributed in the middle of the layer and the most fluid one on the surface of the layer, the said fluid product being sealable onto the lower layer of the lid in such a way that, upon removal of the lid, the upper composite layer of the sheet is torn throughout its thickness by decohesion.

According to other characteristics of the invention:

the composite layer is comprised of a mixture of polyolefin and polystyrene.

when the lower layer of the lid is made of polyethylene, the composite layer contains a polyethylene that is more fluid than the polystyrene.

The invention also pertains to a plastic container made from a sheet, characterised in that the composite upper layer of the sheet is comprised of an heterogeneous mixture of two products, the most fluid one of which is compatible with the lower layer of the lid so as to ensure the seal of the lid.

According to other characteristics of the invention:

The composite layer is comprised of a mixture of polyolefin and polystyrene having different coefficients of viscosity.

The mixture includes a polyolefin and polystyrene or a styrene co-polymer in proportions included, for each compound, between 10% and 90%.

BRIEF DESCRIPTION OF THE DRAWINGS

Other characteristics will come out of the description that follows, made in reference to the attached figure, where the following can be seen.

DETAILED DESCRIPTION OF THE INVENTION

Figure 1:
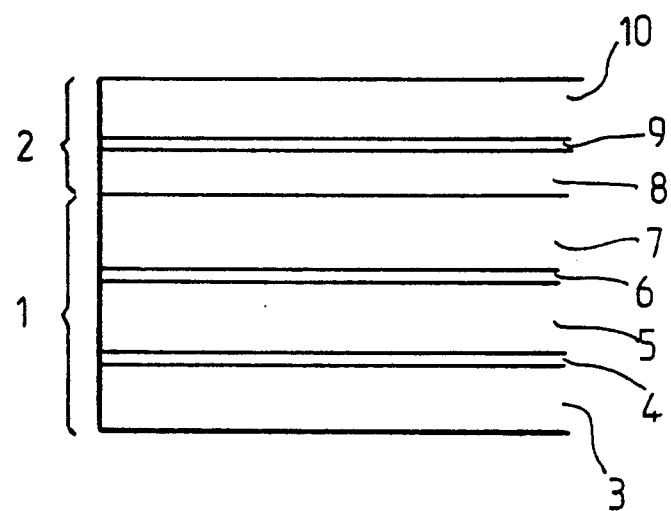
FIG. 1: a view, in section, of the ensemble of a multilayer sheet according to the present invention, designed to make containers, and of a conventional multilayer sheet designed to make lids, after they have been sealed.

In FIG. 1, the multilayer sheet comprising the container can be seen at 1, and the multilayer sheet comprising the lid can be seen at 2. From bottom to top, sheet 1 is comprised of a layer of polystyrene 3, a layer of adhesive 4, a layer of ethylvinylalcohol 5, a layer of adhesive 6 and a composite layer 7 comprised, for example, of a mixture of polyolefin such as polyethylene, polypropylene, etc . . . and polystyrene or styrene co-polymers.

The lid is comprised of a polyethylene layer 8, meant to be sealed to layer 7 to ensure the closing of the container, of a layer of adhesive 9, and of a layer 10 of polyester or of aluminium, for example.

Composite layer 7 is a characteristic of the invention. Indeed, the two products of which it is comprised, for example polyethylene and polystyrene, are not compatible and have different viscosities. Consequently, they do not make an homogeneous layer.

Upon extrusion, the two products are more or less well dispersed, the concentration of the more fluid product tending to increase at the upper part of the layer until forming on the surface a quasi continuous film which ensures sealability with the lower layer of the lid.

As a result, composite layer 7 is indeed sealable to the polyethylene layer 8 of the lid, in view of the predominant presence of polyethylene at the surface of layer 7.

Figure 2:
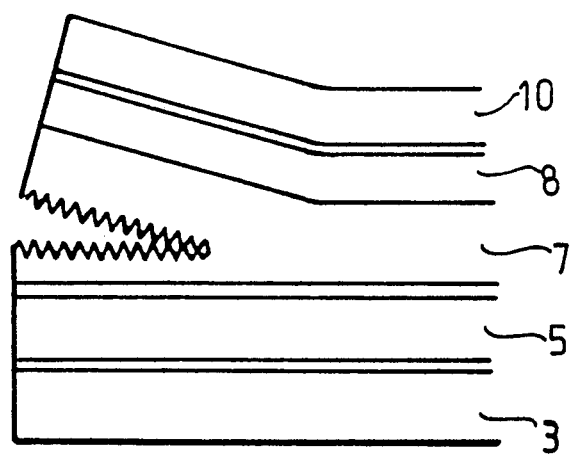
FIG. 2: a view, in section, of the ensemble of the two sheets of FIG. 1 during the opening of the container equipped with such a lid.

In FIG. 2, it can be seen that upon opening of the container, it is not the seal between the two layers 7 and 8 that breaks. On the contrary, this seal, which ensures the imperviousness of the container, is and must be very solid.

Breaking takes place within the thickness of composite layer 7, through decohesion, in view of the heterogeneity of the layer which results in a lack of cohesion.

The invention takes advantage of this lack of cohesion as, when wishing to remove the lid which is sealed to the container, one does not destroy the seal itself but tears part of the upper layer.

When the lid is of the type comprised of superimposed layers of polyester, polyvinyl dichloride, polyethylene, or else of polyamide, polyethylene, a boat with a layer exhibiting little cohesion comprising a skin made of polyethylene, hence compatible with the lid, will be selected.

To this end, it is possible to use a layer made of polyethylene of average density of the type TD 0340 and of super-shock polystyrene of the type 5340.

These products have a viscosity (in Pa.s), under a shearing gradient of $100 \text{ s}^{-1}$ and at 200° C., of 364,1 for polyethylene and of 672,4 for polystyrene, and a viscosity under a shearing gradient of $1000 \text{ s}^{-1}$ and at 200° C., of 114,5 for polyethylene and of 137,7 for polystyrene, which results in the production of a polyethylene skin in surface.

On the other hand, when the lid is made of an aluminium sheet coated with lacquer, it is necessary, to achieve the seal, to have a polystyrene skin on the polyethylene. The regimen of viscosity is then reversed, using a more fluid polystyrene or polystyrene co-polymer, of the type 4520 or 4801, and a polyolefin of higher viscosity, to create the layer having little cohesion.

The sealed container that is formed using the invention remains perfectly closed throughout all the manipulations required during its commercialization, while being easy to open since when a traction effort is applied onto the lid, the upper layer of the container is torn through decohesion, part remaining bound to the lid, and the other part to the container.

According to the invention, the composite layer comprises a polyolefin such as polyethylene or polypropylene in proportions of 10% to 90%, and polystyrene or styrene co-polymers in proportions of 90% to 10%.

By varying the proportions, one modifies the characteristics of sealability and of tearability of the lid.

By increasing the proportion of the most fluid product, the sealability as well as the cohesion of the layer are improved, hence making the removal of the lid more difficult.

By increasing the proportion of the most viscous product, the sealability as well as the cohesion of the layer are perceptibly decreased, hence making the removal of the lid more easy.

We claim:

1. Plastic multilayer sheet for a sealable container having a lid, said sheet being of multiple layers and having an upper layer for sealing to a lower layer, said sheet upper layer being a composite layer comprising an heterogeneous mixture of two materials with different viscosities, the more fluid material forming on the surface to be sealed to the lower lid layer a quasi-continuous film such that after sealing with the lid, said upper composite layer is torn through its thickness by decohesion upon removal of the lid.

2. Sheet according to claim 1 for use with a lid comprising a lower layer of polyolefin, wherein the sheet upper composite layer comprises a mixture of polyolefin and polystyrene, the polyolefin being more fluid than the polystyrene.

3. Plastic container made from a sheet according to claim 1, wherein the upper composite layer comprises a mixture of polyolefin and polystyrene or a styrene co-polymer with different viscosities, the more viscous material being distributed in the middle of said upper layer and the less viscous material being distributed on the surface of said upper layer.

4. Container according to claim 3, wherein the polyolefin is a polyethylene.

5. Container according to claim 3 wherein said mixture contains one material in a proportion in the range between about 10% to about 90% and the other material in a proportion in the range between about 90% and 10%.

6. Container according to claim 4 wherein said mixture contains one material in a proportion in the range between about 10% to 90% and the other material in a proportion in the range between about 90% and 10%.

* * * * *